Sept. 30, 1958 R. A. DOMINGUEZ 2,853,902
LATHE ATTACHMENT
Filed May 27, 1955
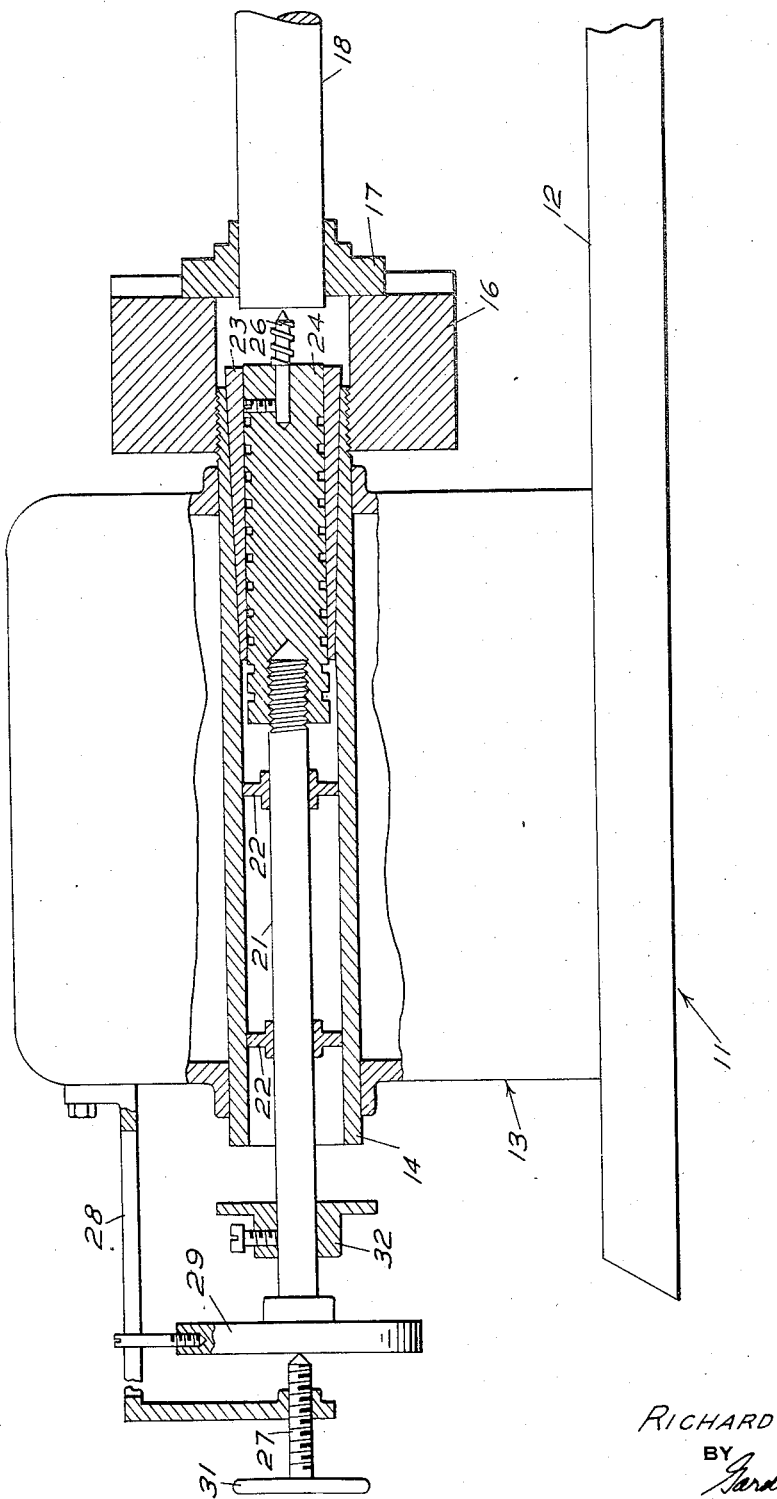
INVENTOR
RICHARD A. DOMINGUEZ
BY
Gardner & Zimmerman
ATTORNEYS

United States Patent Office 2,853,902
Patented Sept. 30, 1958

2,853,902

LATHE ATTACHMENT

Richard A. Dominguez, Albany, Calif.

Application May 27, 1955, Serial No. 511,641

2 Claims. (Cl. 77—18)

The present invention relates to an attachment for lathes and particularly to a device for center boring or center marking work in a lathe.

The establishment of center points particularly on elongated members to be operated upon in such as a machine or engine lathe is often quite tedious and exacting for subsequent turning operations on the lathe can have no greater accuracy than the location of centers about which the work is rotated on the lathe. The present invention provides a simple and effective jig or device which is readily and rapidly attachable to the headstock of any lathe and operable manually or automatically to center bore work held in the lathe chuck. Maximum accuracy is provided by minimizing the amount of work suspended between the chuck to the boring means of the present lathe attachment.

It is an object of the present invention to provide an improved lathe attachment for center marking work in the lathe.

It is a further object to provide a lathe attachment for headstock mounting to center bore work held in the lathe chuck.

Another object is to provide a headstock attachment including a drill mounted in axial alignment with a lathe chuck for center boring work held in the chuck.

A still further object is to provide a lathe attachment including a non-rotating drill slidably mountable in a lathe headstock in axial alignment with the lathe chuck for center boring work held therein.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

An embodiment of the invention is illustrated in the accompanying drawing wherein the sole figure is a longitudinal elevation of a machine lathe headstock and chuck with the lathe attachment of the present invention shown in section.

Considering the details of the illustrated embodiment of the invention and referring to the drawing, there is shown a portion of a lathe 11 upon which the invention is attached including the ways 12 and the headstock 13 mounted at one end thereof. A hollow drive cylinder 14 extends through the head stock 13 parallel to the ways and has secured to one end thereof a lathe chuck 16 which may have adjustable jaws 17 for holding materials to be turned on the lathe. The drive cylinder 14 is rotatably mounted and is adapted to be rotated from a lathe drive means such as a motor or the like through the medium of pulleys and/or gears in a conventional manner. The mounting of work 18, such as a rod, bar or the like, in the chuck by means of the chuck jaws 17 enables same to be rotated by the lathe drive means through the drive cylinder 14 which rotates in the headstock 13.

The lathe attachment of the present invention is mounted upon the lathe headstock 13 and includes a shaft 21 rotatably disposed coaxially through the drive cylinder 14 by means of bearings 22 which are locked to the shaft 21 and spaced along the length thereof. The end of the drive cylinder 14 adjacent the chuck 16 has the inner bore thereof tapered outwardly toward the end to receive a hollow tapered sleeve or bearing 23 such as a Morse Taper sleeve which in turn has an axial bore containing a cylindrical end piece 24 in a running fit therewith. The end piece 24 is secured to the inner end of the shaft 21 as by threaded engagement to rotate therewith and has circumferential oil grooves, as shown, for lubricating the exterior surface thereof engaging the inner sleeve surface. A drill bit 26 is removably mounted axially of the end piece 24 and extending therefrom toward the chuck 16 as by means of a transverse set screw bearing upon the drill end inset within the end piece.

Movement of the shaft 21 and connected end piece 24 and drill 26 axially of the drive cylinder is controlled and actuated by feed means including a feed screw 27 threaded through a stationary mounting bracket 28 and engaging a radial flange 29 transversely of the outer shaft end. The flange 29 is rigidly affixed to the shaft 21 and has an extension thereon engaging an arm of the stationary mount 28 for preventing rotation of the shaft while yet permitting longitudinal translation thereof. The stationary mount 28 may be conveniently bolted or otherwise secured to the headstock 13 and need include only a right angle bracket extending beyond the outer shaft end with a threaded aperture for receiving the feed screw 27. Longitudinal feed of the shaft may be accomplished manually or automatically and a wheel 31 upon the outer end of the feed screw facilitates same. Presetting of the maximum shaft feed is accomplished by an adjustable stop 32 such as a hollow plug about the shaft exterior to the drive cylinder with parts thereof extending radially beyond the drive cylinder and having a transverse set screw adapted to bear upon the shaft for locking the stop in desired position thereof.

Operation of the lathe attachment to drill on the axis of the work 18 is accomplished by energizing the lathe 11 to rotate the drive cylinder 14 and thus the chuck and work. The shaft 21 cannot rotate as the shaft flange extension bears upon the mounting bracket 28 so that the drive cylinder and internal sleeve 23 rotate about the shaft 21 and end piece 24 with the end piece 24 in running contact with the sleeve 24 and the shaft bearings 22 engaging the inner drive cylinder surface to hold the shaft true on the cylinder axis. Drilling is then accomplished by rotating the feed screw 27 in the mounting bracket 28 via the wheel 31 so that the screw moves longitudinally into contact with the shaft end at the flange 29 to force the shaft 21, end piece 24, and extending drill 26 into contact with the end of the work at the center thereof, as shown. It will be appreciated that the chuck is normally rotated by the lathe in such a direction as to receive drills or the like from the opposite side so that it is necessary to operate the lathe in reverse for opposite chuck rotation or to form the drill with backward cutting surfaces, i. e., ground left handed, for the drill to bite into the work 18 and drill same. The depth of drill penetration into the work is limited by the setting of the stop 32.

It will be appreciated that the feed means may be otherwise constituted than as shown, for example the feed screw may be formed upon the shaft itself and any one of numerous conventional feed mechanisms are herein applicable with it being required however that the shaft be maintained from rotating in order that relative rotation of work and drill bit result.

What is claimed is:

1. A lathe attachment comprising a hollow drive cylinder mounted for rotation in the headstock of a lathe in connecting relationship between lathe drive means and lathe chuck, said cylinder having an outward taper to the inner surface thereof adjacent said chuck, a tapered sleeve bearing disposed within said cylinder at the tapered end thereof, a shaft disposed axially through said cylinder in bearing relation to said sleeve and having a drill bit extending axially therefrom toward the center of said chuck, and feed means including a bracket fixed to said lathe headstock and slidably engaging said shaft for fixing same against rotation and screw means bearing on the shaft end for controllably translating said shaft axially of said drive cylinder whereby the drill bit contacts the center of work in said chuck to drill same.

2. A lathe attachment comprising a hollow drive cylinder adapted for rotatable mounting in a lathe headstock engaging lathe drive means and carrying the lathe chuck at one end thereof to rotate same, a shaft disposed axially through said drive cylinder, a tapered sleeve disposed within the chuck end of said cylinder mating with a tapered cylinder surface therein, a cylindrical end piece secured to one end of said shaft and disposed within said sleeve in sliding engagement therewith, a drill bit removably mounted in said end piece and extending therefrom axially of said chuck toward same, a rigid bracket fixed to the lathe headstock and extending into axial alignment with the end of said shaft farthest from said chuck, a radial extension upon said shaft engaging said bracket for fixing said shaft against rotation, and screw means threaded into said bracket and engaging the free end of said shaft for controllably feeding same axially of said cylinder to engage said drill bit with the center of work held in said chuck whereby said work is drilled at the center thereof upon rotation of said chuck by the lathe drive means.

References Cited in the file of this patent
UNITED STATES PATENTS

| | | |
|---|---|---|
| 1,692,230 | Stoddard | Nov. 20, 1928 |
| 1,981,682 | Volger | Nov. 20, 1934 |
| 2,365,939 | Couse | Dec. 26, 1944 |